US006317740B1

(12) United States Patent
Mukherjea et al.

(10) Patent No.: US 6,317,740 B1
(45) Date of Patent: Nov. 13, 2001

(54) METHOD AND APPARATUS FOR ASSIGNING KEYWORDS TO MEDIA OBJECTS

(75) Inventors: Sougata Mukherjea, San Jose; Junghoo Cho, Moutain View, both of CA (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/216,521

(22) Filed: Dec. 16, 1998

Related U.S. Application Data (60) Provisional application No. 60/104,721, filed on Oct. 19, 1998, and provisional application No. 60/105,247, filed on Oct. 22, 1998.

(51) Int. Cl.[7] .................................................... G06F 17/30
(52) U.S. Cl. .......................... 707/4; 707/1; 707/3; 707/5
(58) Field of Search ................................. 707/1, 3, 4, 5, 707/104

(56) References Cited

PUBLICATIONS

Y. Aslandogan et al., "Using Semantic Contents and Word-Net in Image Retrieval," Proceedings of the ACM SIGIR '97 Conference on Research and Development in Information Retrieval, pp. 286–295, Philadelphia, PA, Jul. 1997.

J. R. Bach et al., "The Virage Image Search Engine: A Open Framework for Image Management," Proceedings of the SPIE—The International Society for Optical Engineering: Storage and Retrieval for Still Image and Video Databases IV, San Jose, CA, Feb. 1996.

C. Frankel et al., "WebSeer: An Image Search Engine for the World–Wide Web," Technical Report 96–14, University of Chicago, Computer Science Department, Aug. 1996.

V. Harmandas et al., "Image Retrieval by Hypertext Links," Proceedings of the ACM SIGIR '97 Conference on Research and Development in Information Retrieval, pp. 296–303, Philadelphia, PA, Jul. 1997.

K. Hirata et al., "Media–based Navigation for Hypermedia Systems," Proceedings of ACM Hypertext '93 Conference, pp. 159–173, Seattle, WA, Nov. 1993.

S. Mukherjea et al, "Towards a Multimedia World–Wide Web Information Retrieval Engine," Proceedings of the Sixth International World–Wide Web Conference, pp. 177–188, Santa Clara, CA, Apr. 1997.

N. Rowe, "Using Local Optimality Criteria for Efficient Information Retrieval with Redundant Information Filters," ACM Transactions on Information Systems, 14(2):138–174, Mar. 1996.

N. Rowe et al., "Automatic Caption Localization for Photographs on World–Wide Web Pages," Information Processing and Management, 34(1):95–107, 1998.

A. Smeaton et al., "Experiments on using Semantic Distances between Words in Image Caption Retrieval," Proceedings of the ACM SIGIR '96 Conference on Research and Development in Information Retrieval, pp. 174–180, Zurich, Switzerland, Aug. 1996.

*Primary Examiner*—Paul R. Lintz
(74) *Attorney, Agent, or Firm*—Sughrue, Mion, Zinn, Macpeak & Seas, PLLC (57) ABSTRACT

A method and apparatus are defined for assigning keywords to media objects in files. The media objects include image, video and audio, for example. Various criteria are used for assigning the keywords, including measuring visual distance, measuring syntactical distance, detecting regular patterns in a table and detecting groups of images.

48 Claims, 6 Drawing Sheets

Here is a collection of stained glass windows from england. Due to my still developing skill door photography, the windows do not look as great as they really are. I hope you enjoy.

photos taken with a Cannon A-1 camera with 200 speed film.

Click on an image to view larger version

FIG. 1

Here is a collection of stained glass windows from england. Due to my still developing skill door photography, the windows do not look as great as they really are. I hope you enjoy.

photos taken with a Cannon A-1 camera with 200 speed film.

Click on an image to view larger version

FIG. 3A

Zebras in Buffalo Springs National Reserve:

Giraffes in Masai Mara National Reserve:

FIG. 3B

Here a woman works in her outdoor kitchen

The old Maharawal's Palace

The annual camel market at the town of Pushkar

FIG. 3C

- *Femme à l'ombrelle tournée vers la gauche*

- *Le bateau atelier (The Boat Studio)*

1876 (160 Kb); Oil on canvas, 72x59.8 cm (28 3/8 x 23 1/2 in); The Barnes Foundation, Merion, Pennsylvania

- *La Japonaise*

1876; Museum of Fine Arts, Boston

FIG. 4

Morgan Freeman

Mel Gibson

FIGURE 5

METHOD AND APPARATUS FOR ASSIGNING KEYWORDS TO MEDIA OBJECTS

This application claims the benefit of U.S. Provisional Application No. 60/104,721, entitled, "A Method and Apparatus for Assigning Keywords to Media Objects," filed on Oct. 19, 1998, by Sougata Mukherjea et al. and U.S. Provisional Application No. 60/105,247, entitled, "A Method and Apparatus for Assigning Keywords to Media Objects," filed on Oct. 22, 1998, by Sougata Mukherjea et al. which are both incorporated by reference herein.

BACKGROUND OF THE INVENTION

1. Field of the Invention

The present invention relates generally to the field of assigning keywords to media objects located in files stored in a database.

2. Description of the Related Art

With the explosive growth of information that is available through the World-Wide Web ("WWW"), it is becoming increasingly difficult for a user to find information that is of interest to him/her. Therefore, various search mechanisms that allow a user to retrieve documents of interest are becoming very popular. However, most of the popular search engines today are textual. Given one or more keywords, such search engines can retrieve WWW documents that have those keywords. Although most WWW pages have images, the current image search engines on the WWW are primitive.

There are two major ways to search for an image. First, a user can specify an image and the search engine can retrieve images similar to the specified image. Second, the user can specify keywords and all images relevant to the user specified keywords can be retrieved. The present inventor has been involved in the development of an image search engine called the Advanced Multimedia Oriented Retrieval Engine (AMORE). See S. Mukherjea et al, "Towards a Multimedia World-Wide Web Information Retrieval Engine," Proceedings of the Sixth International World-Wide Web Conference, pages 177–188, Santa Clara, Calif., April 1997; and http://www.ccrl.com/amore. AMORE allows the retrieval of WWW images using both of the techniques. In AMORE the user can specify keywords to retrieve relevant images or can specify an image to retrieve similar images.

The similarity of two images can be determined in two ways: visually and semantically. Visual similarity can be determined by image characteristics like shape, color and texture using image processing techniques. In AMORE, Content-Oriented Image Retrieval (COIR) is used for this purpose. See K. Hirata et al., "Media-based Navigation for Hypermedia Systems," Proceedings of ACM Hypertext '93 Conference, pages 159–173, Seattle, Wash., November 1993. When a user wants to find images similar to a red car, COIR can retrieve pictures of other red cars. However, it may also be possible that the user is not interested in pictures of red cars, but pictures of other cars of similar manufacturer and model. For example, if the specified image is an Acura NSX, the user may be interested in other Acura NSX images. Finding semantically similar images (i.e. other images having the same or similar associated semantics) is useful in this example. Considering another example, a picture of a figure skater may be visually similar to the picture of an ice hockey player (because of the white background and similar shape), but it may not be meaningful for a user searching for images of ice hockey players. Finding semantically similar images will be useful in this example as well.

In order to find images which are semantically similar to a given image, the meaning of the image must be determined. Obviously this is not very easy. The best approach would be to assign several keywords to an image to specify its meaning. Manually assigning keywords to images would give the best result, but is not feasible for a large collection of images. Alternatively, the text associated with images can be used as their keywords. Unfortunately, unlike written material, most HyperText Markup Language (HTML) documents do not have an explicit caption. Therefore, the HTML source file must be parsed and only keywords "near" an image should be assigned to it. However, because the HTML page can be structured in various ways, the "nearness" is not easy to determine. For example, if the images are in a table, the keywords relevant to an image may not be physically near the image in the HTML source file. Thus, several criteria are needed to determine the keywords relevant to an image.

There are many popular WWW search engines, such as Excite (http://www.excite.com) and Infoseek (http://www.infoseek.com). These engines gather textual information about resources on the WWW and build up index databases. The indices allow the retrieval of documents containing user specified keywords. Another method of searching for information on the WWW is manually generated subject-based directories which provide a useful browsable organization of information. The most popular one is Yahoo (http://www.yahoo.com). However, none of these systems allow for image searching.

Image search engines for the WWW are also being developed. Excalibur's Image Surfer (http://isurf.yahoo.com) and WebSEEk (see S. Chang et al., "Visual Information Retrieval From Large Distributed Online Repositories," Communications of the ACM, 40(12):63–71, December 1997) have built a collection of images that are available on the WWW. The collection is divided into categories (like automotive, sports, etc), allowing a user to browse through the categories for relevant images. Keyword searching and searching for images visually similar to a specified image are also possible. Alta Vista's Photo Finder (http://image.altavista.com) also allows keyword and visually similar image searches. However, semantically similar searching is not possible in any of these systems.

WebSeer is a crawler that combines visual routines with textual heuristics to identify and index images on the WWW. See C. Frankel et al., "WebSeer: An Image Search Engine for the World-Wide Web," Technical Report 96–14, University of Chicago, Computer Science Department, August 1996. The resulting database is then accessed using a text-based search engine that allows users to describe the image that they want using keywords. The user can also specify whether the desired image is a photograph, animation, etc. However, the user can not specify an image and find similar images.

Finding visually similar images using image processing techniques is a developed research area. Virage (see J. R. Bach et al., "The Virage Image Search Engine: An Open Framework for Image Management," Proceedings of the SPIE—The International Society for Optical Engineering: Storage and Retrieval for Still Image and Video Databases IV, San Jose, Calif., February 1996) and QBIC (see M. Flickner et al., "Query by Image and Video Content: The QBIC System," IEEE Computer, 28(9):23–48, September 1995) are systems for image retrieval based on visual features, which consist of image primitives, such as color, shape, or texture and other domain specific features. Although they also allow keyword search, the keywords need to be manually specified and there is no concept of semantically similar images.

Systems for retrieving similar images by semantic content are also being developed. See A. Smeaton et al., "Experiments on using Semantic Distances between Words in Image Caption Retrieval," Proceedings of the ACM SIGIR '96 Conference on Research and Development in Information Retrieval, pages 174–180, Zurich, Switzerland, August 1996 and Y. Aslandogan et al., "Using Semantic Contents and WordNet in Image Retrieval," Proceedings of the ACM SIGIR '97 Conference on Research and Development in Information Retrieval, pages 286–295, Philadelphia, Pa., July 1997. However, these systems also require that the semantic content be manually associated with each image. For these techniques to be practical for the WWW, automatic assignment of keywords to the images is essential.

Research looking into the general problem of the relationship between images and captions in a large photographic library like a newspaper archive has been undertaken. See R. Srihari, "Automatic Indexing and Content-based Retrieval of Captioned Images," IEEE Computer, 28(9):49–56, September 1995 and N. Rowe, "Using Local Optimality Criteria for Efficient Information Retrieval with Redundant Information Filters," ACM Transactions on Information Systems, 14(2):138–174, March 1996. These systems assume that captions have already been extracted from the pictures, an assumption not easily applicable to the WWW.

Various techniques have been developed for assigning keywords to images on the WWW. However, none of these techniques can perform reasonably well on all types of HTML pages. Also, problems exist because different people put captions for images in different locations. Thus, it is difficult to establish a single procedure for assigning keywords to images. Further, it is possible that in the source file for a document, a caption will be located between two images or distant from the single relevant image. In such a case, it is difficult to determine how the caption will be assigned.

WebSEEk uses WWW Universal Resource Locator (URL) addresses and HTML tags associated with images to extract the keywords. See S. Chang et al., "Visual Information Retrieval From Large Distributed Online Repositories," Communications of the ACM, 40(12):63–71, December 1997. This will result in low recall since not all of the text surrounding an image is considered.

Figure 1:
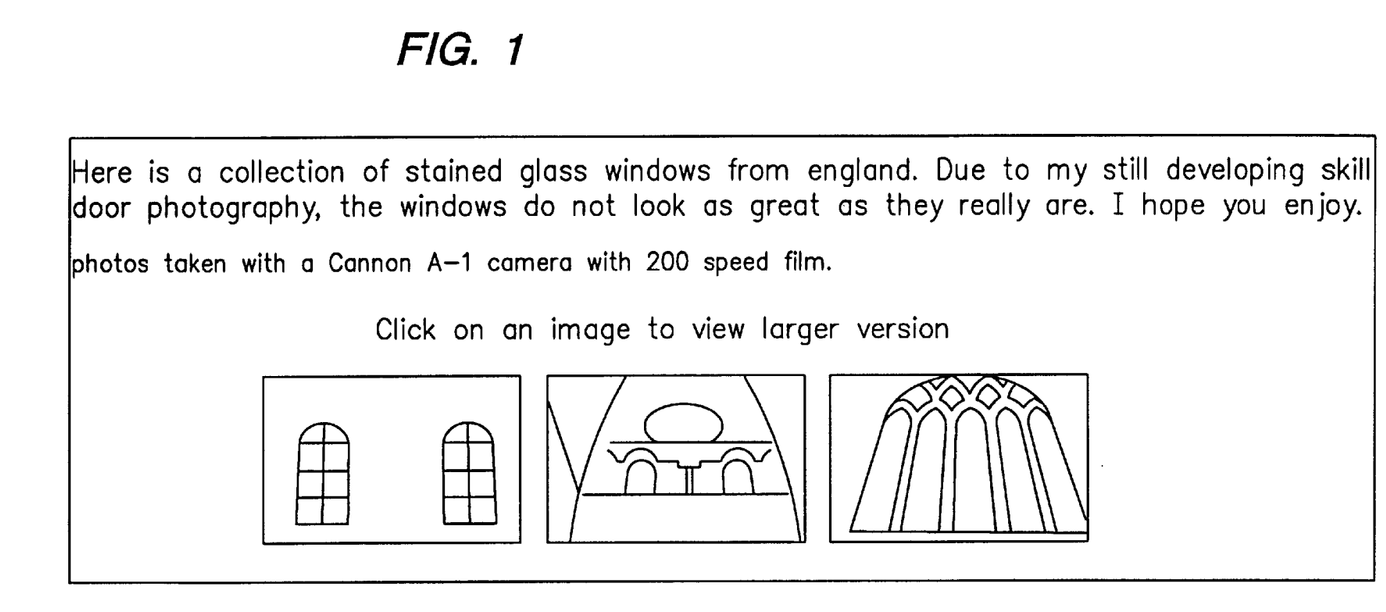
FIG. 1 shows an example of a group of images defined by a single caption.

Harmandas et al. uses the text after an image URL until the end of a paragraph or until a link to another image is encountered as the caption of the image. See V. Harmandas et al., "Image Retrieval by Hypertext Links," Proceedings of the ACM SIGIR '97 Conference on Research and Development in Information Retrieval, pages 296–303, Philadelphia, Pa., July 1997. Harmandas et al. evaluated the effectiveness of retrieval of images based on (a) the caption text, (b) caption text of other images of the page, (c) the non-caption text of the page and (d) the full-text of all pages linked to the image page. However, this method of defining captions will not work for the situation where a collection of images in a WWW page is described by a single caption at the top or bottom of the page. An example of this situation is shown in FIG. 1. Moreover, indexing an image by the full-text of all pages linked to the image page may result in many irrelevant images being retrieved.

The Marie-3 system uses text "near" an image to identify a caption. See N. Rowe et al., "Automatic Caption Localization for Photographs on World-Wide Web Pages," Information Processing and Management, 34(1):95–107, 1998. "Nearness" is defined as the caption and image being within a fixed number of lines in the parse of the source HTML file. There is an exception if an image occurs within these lines. In this case the caption-scope nonintersection principle is true. This principle states that the scope for a caption of one image cannot intersect the scope for a caption of another image. Although Rowe et al. found this principle to be true in all of their examples, they considered a small section of the WWW. In some cases the same caption is used for a collection of images, as shown in FIG. 1. This figure also shows that defining nearness to be a fixed number of lines in the source file will not work because a caption at the top of a page can describe a group of images on the page.

WebSeer, discussed briefly above, considers various features as criteria to index the images. For example, image name, ALT tags, HTML tags, text in hyperlinks and image captions can be used. In one particular example, the caption of an image may be the text in the same center tag (used to place the image within the HTML document as displayed) as the image, within the same cell of a table as the image or the same paragraph as the image. See C. Frankel et al., "WebSeer: An Image Search Engine for the World-Wide Web," Technical Report 96–14, University of Chicago, Computer Science Department, August 1996. However, it appears that this system will not assign all the relevant text of an image if the image and text are arranged in a table, since the system only assigns the text in the same cell as the image to the image. For example, for the table shown in FIG. 2, the image and the text relevant to it are in different cells.

SUMMARY OF THE INVENTION

To overcome these and other difficulties, the present invention is directed to a method and apparatus for assigning keywords to media objects in files. The media objects include image, video and audio objects, for example. Various criteria for assigning the keywords in accordance with the present invention are presented, including visual distance measurement, syntactic distance measurement, detecting regular patterns in a table and detecting groups of images.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of a method and apparatus for assigning keywords to media objects, according to the present invention, is described below in detail with reference to the accompanying drawings. It is to be noted that while the present invention is presented in the context of assigning captions or keywords to images in documents in HTML format on the WWW using AMORE, the present invention is not so limited. The present invention is applicable not only to assigning keywords to images, but to all types of media objects, including video and audio, for example. Further, the present invention is not limited to documents in HTML format, but applies to files in any tag-based language, such as Extensible Markup Language (XML) or Standard Generalized Markup Language (SGML). Finally, the present invention is not limited to WWW application, but may be applied generally to any database of files containing the media objects.

Various information available on the WWW may be used to assign keywords to images. Some useful examples of such sources are discussed as follows. Keywords from all of these sources may be associated with the appropriate image.

First, image file names can be useful in determining the contents of the file, unless the file is given a meaningless name, such as img001.gif. In certain cases, images have names like jordan1.gif, jordan_b.gif, etc., if there are many images of the same kind. To assign the relevant keyword jordan to all of these images, the extension as well as the non-letter characters can be removed from the image name. Any text separated by non-letter characters may be considered as text separated by blanks. Thus, an image michael_jordan.gif can be retrieved by michael, jordan or the phrase "michaeljordan."

Second, the URL of an image often describes the image well. For example, for the image http://www.nbm.com/finals97/gallery/champions/jordan_floor.jpg the keywords nba, finals97, jordan, etc. are very helpful.

Third, when an image may be accessed by following a hyperlink, the text in the link, known as the anchor text, often describes the linked image well.

Fourth, the ALT text HTML tag allows people to annotate an image as an "ALT=text" attribute. The text associated with the image by ALT is displayed if the image cannot be loaded, and the text also shows up when the mouse cursor stays over the image. Note that although this ALT attribute is the "official" way to annotate images, most authors are not aware of it, or simply do not use it. Therefore, many images on the WWW do not have an ALT attribute at all.

Fifth, the title of an HTML page gives the general idea behind the page. Therefore, it is also useful in understanding the semantic content of the image in the page.

Sixth, the text of the embedding page, i.e., the text surrounding an image, describes the image in detail in many cases.

Seventh, text appearing in HTML headings in H{1–6} tags are also useful. However, only headings before the image tend to be relevant. Moreover, certain headings may be ignored by AMORE. For example, consider the following source file excerpt:

```
<BODY>
    <H1>Top heading</H1>
        <H2>Section 1 heading</H2>
            ...
            <H3>Subsection heading</H3>
            ...
        <H2>Section 2 heading</H2>
            ...
            <IMG SRC="img.gif">
            ...
```

In this case, the text for Subsection Heading is not relevant for the image since it is for a different section. Therefore, whenever a heading $H_i$ is encountered, all text for the headings $H_j$ with j>i can be ignored.

Assigning surrounding text to images is a challenging problem. When a WWW page contains many images, it is ambiguous which part of the text belongs to which image. First, the difficulty of surrounding text assignment will be explained. Second, the criteria to resolve the ambiguity in accordance with the present invention will be discussed.

Figure 2:
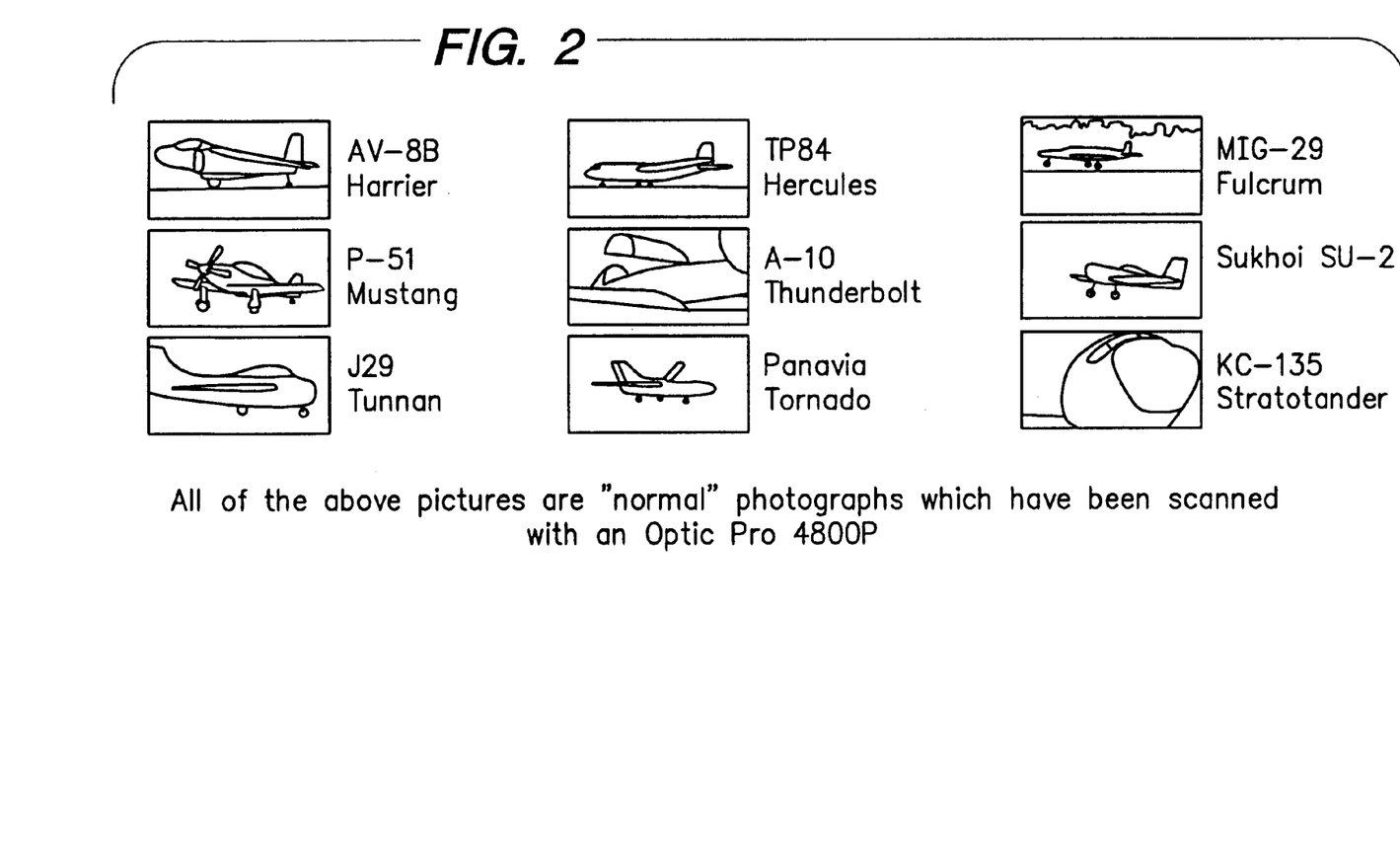
FIG. 2 shows an example of images and text arranged in a table format.
Figure 3A:
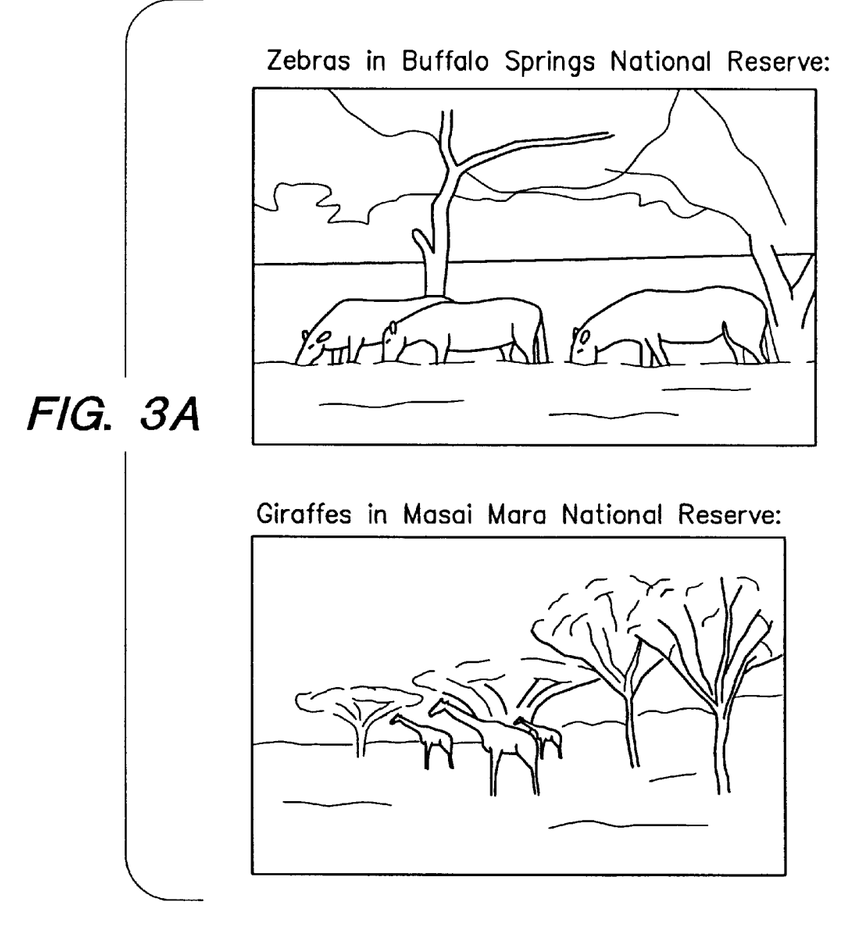
FIGS. 3(a)–3(c) show different examples of image and caption arrangements.
Figure 3B:
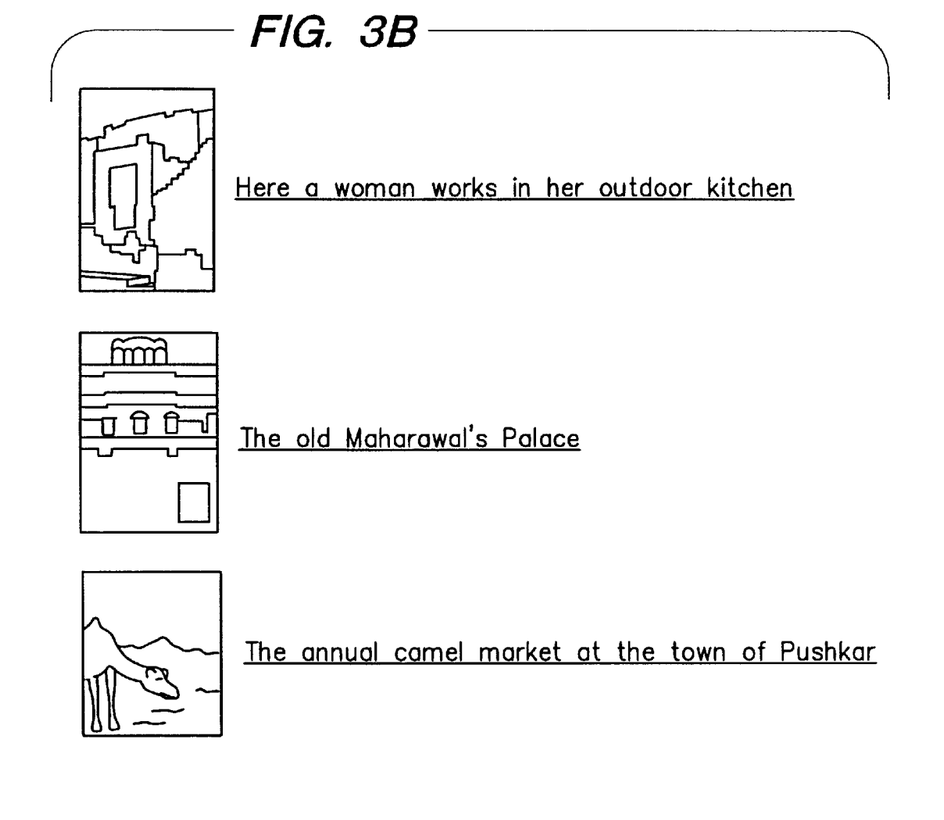
Figure 3C:
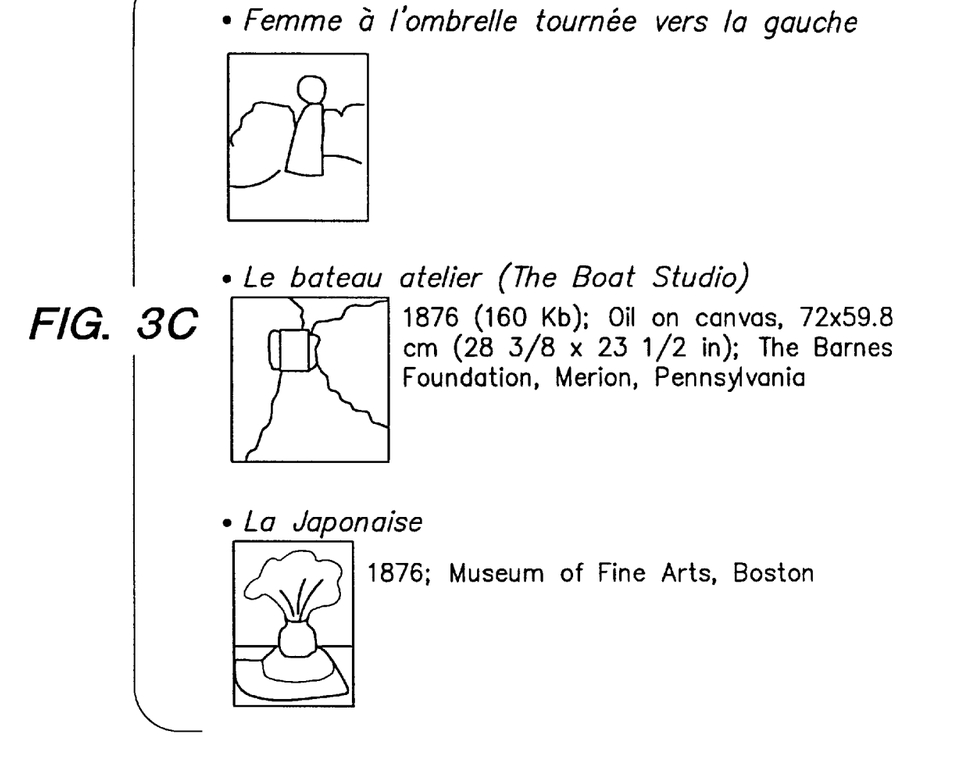

FIGS. 2 and 3 shows several examples of how people annotate WWW images. As can be seen from these figures, there is no predefined or dominant way to arrange images and captions. Sometimes people attach captions before images (FIG. 3(a)), sometimes after images (FIG. 3(b)), and even sometimes before and after images (FIG. 3(c)). It is also common to use a table to arrange images and captions (FIG. 2). Despite this heterogeneity, most prior work has assumed that all images in a collection follow a specific arrangement scheme, e.g. captions will always appear before an image or they will always appear after the image. This assumption may be valid for a carefully selected set of pages, but none of them work for a general collection of WWW pages. Moreover, all previous works defined "nearness" as the nearness in the source HTML file. Therefore, when the final presentation of a page in a browser is different from its arrangement in its source HTML file, previous approaches fail.

In accordance with the present invention, the following four criteria may be used to assign text to images, thereby addressing the aforementioned problems.

The first criterion is visual distance. When text appears in between images, the visual distance of the text to each image is calculated, and the text is assigned to the image which is visually the closest to the text.

This first criterion takes advantage of general human tendency. As can be seen from the examples in FIG. 3, people usually arrange captions nearby the images that they are describing. Most people feel uncomfortable or aesthetically incorrect, when a caption appears closer to an unrelated image.

More precisely, in accordance with the present invention, the visual distance is formalized as follows. The source file of the document containing the image is examined. In such a source file, a sentence is defined as a sequence of characters without any line breaks or images in the middle. In HTML, line breaks are generated by the <BR> tag or <P> tag, to name a few. Also the number of line breaks between sentences are counted. For example, <BR> generates one line break and (P) generates two line breaks. Then a paragraph is defined as a sequence of sentences connected by fewer than two line breaks. In one example, the assignment of text to images may be done on a paragraph level, where one whole paragraph can be assigned to one image. When it is ambiguous which image a paragraph can be assigned to, i.e., when the paragraph appears in between images, the line break count between the paragraph and the images is compared and the paragraph is assigned to the closer image. Thus, in accordance with the present invention, the text and the tags in the source file are examined to determine which image is visually closer to the text. This is distinct from the "nearness" criterion discussed above, which only examines the number of lines of text between images and does not consider visual distance, as expressed through the use of tags. According to this visual distance criterion, all the portions of text in FIG. 3 will be assigned to appropriate images.

Figure 4:
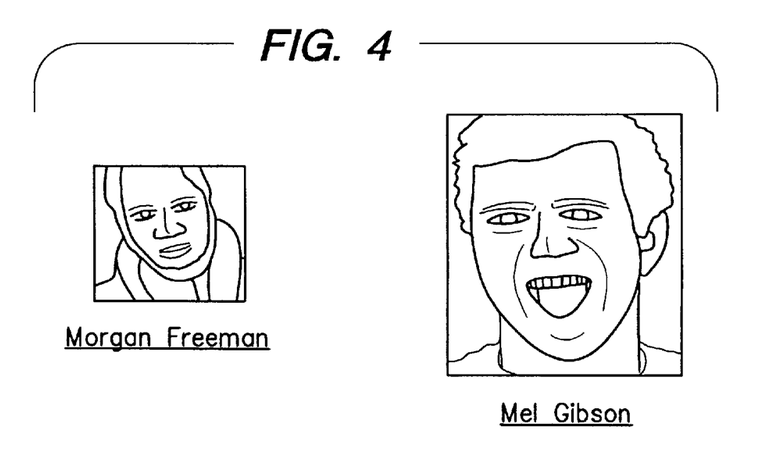
FIG. 4 shows an example where text is located halfway between two images.

The second criterion is syntactic distance. Sometimes, text is located at the same visual distance from any of its neighboring images (see FIG. 4). In these cases, the text is syntactically compared with the names of the source files of its neighboring images. The text is then assigned to the image with the syntactically closest name. The intuition behind this scheme is that people usually give a meaningful name to images. For example, the name of the first image in FIG. 4 is "freeman" standing for "Morgan Freeman", and the name of the second image is "mgib" standing for "Mel Gibson". Therefore, the caption "Morgan Freeman" is more similar to the name "freeman" than the name "mgib".

More precisely, the file name part of the URL of an image is called the name of the image. For example, the URL of the first image in FIG. 4 is http://www.pair.com/marilynn/freeman.gif, and the name is freeman. The syntactic distance between the name n and the text t, d(n, t), is defined as $$d(n, t) = \frac{c(n, t)}{|n|}$$

where |n| is the number of characters in n, and c(n, t) is the number of characters in n that also appear in t in the same order. By this definition, the distance between the name "freeman" and the text "Morgan Freeman" is 1, because all the characters in the name "freeman" also appear in the text in the same order. The distance between the name of the second image, "mgib" and the text "Morgan Freeman" is 0.5, because only m and g appear in the text in the proper order.

The third criterion searches for regular patterns in a table. In many cases, people follow the same commenting scheme within a single page. If a caption appears after an image, the same is most likely to be true for all other captions in the same page. This third criterion is based on this regularity of image-caption arrangement.

The regular pattern can be easily identified when images and their captions are arranged in a table (FIG. 2). To detect the regular pattern, the source file for the entire table is parsed and the table is vertically and horizontally scanned. If images appear at regular intervals (i.e., within a certain number of cells or visual distance) either vertically or horizontally, then all the text in one interval is assigned to the image in that interval. By this criterion, the captions in FIG. 2 may be correctly assigned to their images. Note that for this example, visual distance criterion alone would be insufficient to correctly assign the captions since the captions are equidistant from their neighbor images.

The fourth criterion searches for a group of images. As is shown in FIG. 1, it is also common that one caption describes a set of following (or preceding) images. These cases are detected by examining the source file of the page containing the images to determine whether a sequence of images appear without any text in between. When a set of images appear consecutively, the surrounding text is assigned to all images in the set. Note that when a paragraph is located between two sets of images, it may be ambiguous where the paragraph should be assigned. In this case, the visual distance measure can be applied to the last image in the preceding set and first image in the following set of images to resolve the ambiguity.

Figure 5:
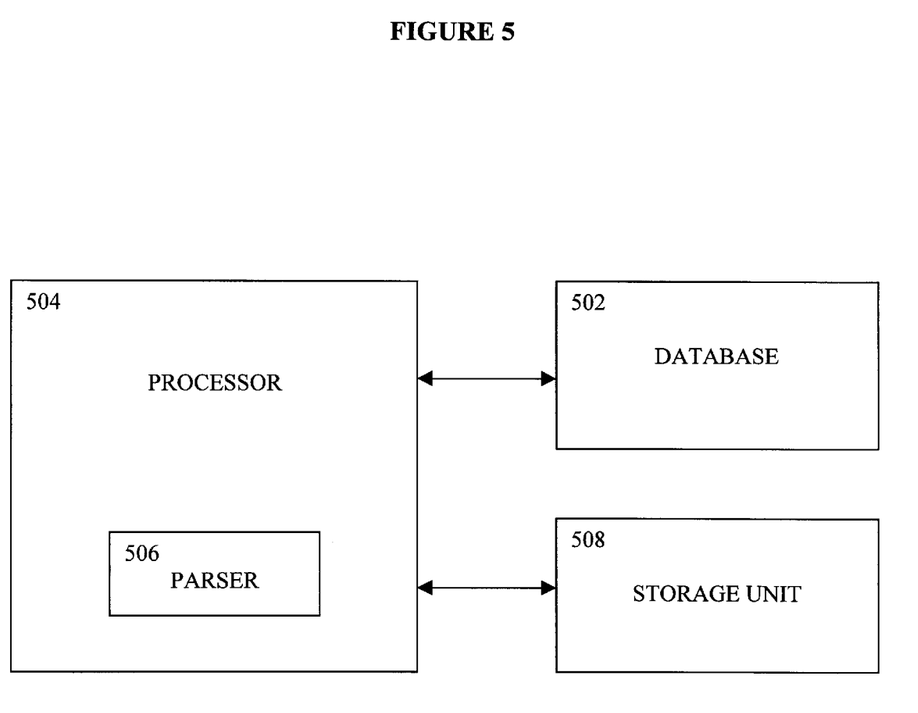
FIG. 5 shows an exemplary hardware environment in which the present invention may be practiced.

An example of a physical environment in which the present keyword assignment invention may be practiced is shown in FIG. 5. The figure shows a database 502 in which the HTML files or documents are stored. This database may be gathered from the WWW using a web spider or crawler, for example. In order to assign keywords to images in documents, in accordance with the present invention, the documents are processed in processor 504, which may be part of a workstation, for example. In particular, the source files of the documents are parsed by parser 506, located within processor 504 to obtain the structure of the document. Then the processor 504 assigns keywords to the images in accordance with the four criteria described above. The results of the keyword assignment can then be stored in storage unit 508.

Thus, in accordance with the present invention, a method and apparatus are provided for assigning keywords to media objects.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of automatically assigning keywords to media objects contained in documents, where source files of the documents are disposed in a database, the method comprising the steps of:
   a) calculating a visual distance between a portion of text in one of the documents and each of two of the media objects in the one of the documents; and
   b) assigning the portion of text as the keywords to one of the two media objects having a shorter visual distance to the portion of text.

2. The method according to claim 1, wherein visual distance is calculated using the portion of text and tags in one of the source files associated with the one of the documents.

3. The method according to claim 1, wherein the database is disposed on one of the World Wide Web, a digital library and a storage medium.

4. The method according to claim 1, wherein the source files are in a tag-based language.

5. The method according to claim 4, wherein sources of the keywords include a Universal Resource Locator of the media objects, anchor text, media object annotations, file title, text surrounding the media objects and page headings.

6. The method according to claim 1, wherein the media objects include image objects, video objects and audio objects.

7. A method of automatically assigning keywords to media objects contained in documents, where source files of the documents are disposed in a database, the method comprising the steps of:
   a) when text in one of the documents is disposed at a substantially equal visual distance from two of the media objects in the one of the documents, calculating a syntactical distance between the text and a file name of each of the two media objects, the text and file name being derived from one of the source files associated with the one of the documents; and
   b) assigning the text as the keywords to one of the media objects having the larger syntactical distance from the file name.

8. The method according to claim 7, wherein the syntactical distance is calculated in accordance with the following formula:

$$d(n, t) = \frac{c(n, t)}{|n|}$$

where n is the file name, t is the text d(n, t) is the syntactical distance, |n| is a number of characters in n, and c(n, t) is a number of characters in n which also appear in t in a same order.

9. The method according to claim 7, wherein the database is disposed on one of the World Wide Web, a digital library and a storage medium.

10. The method according to claim 7, wherein the source files are in a tag-based language.

11. The method according to claim 10, wherein sources of the keywords include a Universal Resource Locator of the media objects, anchor text, media object annotations, file title, text surrounding the media objects and page headings.

12. The method according to claim 7, wherein the media objects include image objects, video objects and audio objects.

13. A method of automatically assigning keywords to media objects contained in documents, where source files of the documents are disposed in a database, the method comprising the steps of:
   (a) when one of the documents is in table format, scanning one of the source files associated with the one of the documents to determine when ones of the media objects appear at intervals; and
   (b) when media objects appear at intervals, assigning text within a given interval as the keywords to any of the media objects occurring in the same interval.

14. The method according to claim 13, wherein each of the intervals comprises one or more cells in the table format.

15. The method according to claim 13, wherein each of the intervals comprises a fixed visual distance in the table format.

16. The method according to claim 13, wherein the database is disposed on one of the World Wide Web, a digital library and a storage medium.

17. The method according to claim 13, wherein the source files are in a tag-based language.

18. The method according to claim 15, wherein sources of the keywords include a Universal Resource Locator of the media objects, anchor text, media object annotations, file title, text surrounding the media objects and page headings.

19. The method according to claim 13, wherein the media objects include image objects, video objects and audio objects.

20. A method of automatically assigning keywords to media objects contained in documents, where source files of the documents are disposed in a database, the method comprising the step of:
   (a) when a sequence of media objects occurs in one of the source files associated with one of the documents without any intervening text, assigning any surrounding text as the keywords to each of the media objects in the sequence of media objects.

21. The method according to claim 20, wherein the database is disposed on one of the World Wide Web, a digital library and a storage medium.

22. The method according to claim 20, wherein the source files are in a tag-based language.

23. The method according to claim 22, wherein sources of the keywords include a Universal Resource Locator of the media objects, anchor text, media object annotations, file title, text surrounding the media objects and page headings.

24. The method according to claim 20, wherein the media objects include image objects, video objects and audio objects.

25. A system for automatically assigning keywords to media objects contained in documents, the system comprising:
   a) a database for storing source files of the documents;
   b) a parser for parsing said source files, thereby creating parsed files;
   c) a processor,
      wherein, the parser is part of the processor;
      further wherein, the processor examines one of the parsed files associated with one of the documents and calculates a visual distance between a portion of text in the one of the documents and each of two of the media objects in the one of the documents; and
      further wherein, the processor assigns the portion of text as the keywords to one of the two media objects having a shorter visual distance to the portion of text; and
   d) a storage unit for storing the media objects and assigned keywords.

26. The system according to claim 25, wherein the processor calculates the visual distance using the portion of text and tags in the one of the parsed files associated with the one of the documents.

27. The system according to claim 25, wherein the database is disposed on one of the World Wide Web, a digital library and a storage medium.

28. The system according to claim 25, wherein the source files are in a tag-based language.

29. The system according to claim 28, wherein sources of the keywords include a Universal Resource Locator of the media objects, anchor text, media object annotations, file title, text surrounding the media objects and page headings.

30. The system according to claim 25, wherein the media objects include image objects, video objects and audio objects.

31. A system for automatically assigning keywords to media objects contained in documents, the system comprising:
   a) a database for storing source files of the documents;
   b) a parser for parsing the source files, thereby creating parsed files;
   c) a processor,
      wherein, the parser is part of the processor;
      further wherein, when text in one of the documents is disposed at a substantially equal visual distance from two of the media objects in the one of the documents, the processor examines one of the parsed files associated with the one of the documents and calculates a syntactical distance between the text and a file name of each of the two media objects, the text and file name being derived from the one of the parsed files associated with the one of the documents; and
      further wherein, the processor assigns the text as the keywords to one of the media objects having the larger syntactical distance from the file name; and
   d) a storage unit for storing the media objects and assigned keywords.

32. The system according to claim 31, wherein the syntactical distance is calculated in accordance with the following formula:

$$d(n, t) = \frac{c(n, t)}{|n|}$$

where n is the file name, t is the text, d(n, t) is the syntactical distance, $|n|$ is a number of characters in n, and c(n, t) is a number of characters in n which also appear in t in a same order.

33. The system according to claim 31, wherein the database is disposed on one of the World Wide Web, a digital library and a storage medium.

34. The system according to claim 31, wherein the source files are in a tag-based language.

35. The system according to claim 34, wherein sources of the keywords include a Universal Resource Locator of the media objects, anchor text, media object annotations, file title, text surrounding the media objects and page headings.

36. The system according to claim 31, wherein the media objects include image objects, video objects and audio objects.

37. A system for automatically assigning keywords to media objects contained in documents, the system comprising:
   a) a database for storing source files of the documents;
   b) a parser for parsing said source files, thereby creating parsed files;
   c) a processor,
      wherein, the parser is part of the processor;
      further wherein when one of the documents is in table format, the processor scans one of the parsed files associated with the one of the documents to determine when ones of the media objects appear at intervals; and
      wherein, when ones of the media objects appear at intervals, the processor assigns text within a given interval as the keywords to ones of the media objects occurring in the same interval; and
   d) a storage unit for storing the media objects and assigned keywords.

38. The system according to claim 37, wherein each of the intervals comprises one or more cells in the table format.

39. The system according to claim 37, wherein each of the intervals comprises a fixed visual distance in the table format.

40. The system according to claim 37, wherein the database is disposed on one of the World Wide Web, a digital library and a storage medium.

41. The system according to claim 37, wherein the source files are in a tag-based language.

42. The system according to claim 37, wherein sources of the keywords include a Universal Resource Locator of the media objects, anchor text, media object annotations, file title, text surrounding the media objects and page headings.

43. The system according to claim 37, wherein the media objects include image objects, video objects and audio objects.

44. A system for automatically assigning keywords to media objects contained in documents, the system comprising:
   a) a database for storing source files of the documents;
   b) a parser for parsing the source files, thereby creating parsed files;
   c) a processor,
      wherein, the parser is part of the processor;
      further wherein, when a sequence of media objects occurs in one of the parsed files associated with one of the documents without any intervening text, the processor assigns any surrounding text as the keywords to each of the media objects in the sequence of media objects; and
   d) a storage unit for storing the media objects and assigned keywords.

45. The system according to claim 44, wherein the database is disposed on one of the World Wide Web, a digital library and a storage medium.

46. The system according to claim 44, wherein the source files are in a tag-based language.

47. The system according to claim 46, wherein sources of the keywords include a Universal Resource Locator of the media objects, anchor text, media object annotations, file title, text surrounding the media objects and page headings.

48. The system according to claim 44, wherein the media objects include image objects, video objects and audio objects.

* * * * *